(12) United States Patent
Liesenfeld

(10) Patent No.: US 11,820,440 B2
(45) Date of Patent: Nov. 21, 2023

(54) ELECTROMECHANICALLY ASSISTED STEERING SYSTEM

(71) Applicant: ZF Automotive Germany GmbH, Alfdorf (DE)

(72) Inventor: Guido Liesenfeld, Neuss (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 16/891,000

(22) Filed: Jun. 2, 2020

(65) Prior Publication Data

US 2020/0385050 A1 Dec. 10, 2020

(30) Foreign Application Priority Data

Jun. 5, 2019 (DE) .......................... 102019115232.1

(51) Int. Cl.
  *B62D 5/04* (2006.01)
  *F16H 1/16* (2006.01)
  *F16H 55/22* (2006.01)
  *F16H 57/021* (2012.01)

(52) U.S. Cl.
  CPC ............ *B62D 5/0421* (2013.01); *F16H 1/16* (2013.01); *F16H 55/22* (2013.01); *F16H 2057/0213* (2013.01)

(58) Field of Classification Search
  CPC .......... B62D 5/0421; F16H 2057/0213; F16H 55/22; F16H 1/16
  See application file for complete search history.

(56) References Cited

U.S. PATENT DOCUMENTS

| 2002/0195893 | A1* | 12/2002 | Kobayashi | B62D 5/0409 310/83 |
| 2011/0155499 | A1* | 6/2011 | Wilkes | B62D 5/0409 180/444 |
| 2018/0058555 | A1* | 3/2018 | Wilkes | F16H 1/16 |
| 2018/0073627 | A1* | 3/2018 | Gibbs | F16H 57/039 |
| 2018/0154927 | A1* | 6/2018 | Wilkes | B62D 5/04 |
| 2020/0102002 | A1* | 4/2020 | Kirschstein | F16H 1/16 |
| 2020/0156697 | A1* | 5/2020 | Jordan | F16H 19/02 |

FOREIGN PATENT DOCUMENTS

| DE | 102008042609 A1 | 4/2010 |
| DE | 102010003727 A1 | 10/2011 |
| DE | 102013006637 A1 | 10/2013 |
| WO | 2018060701 A1 | 4/2018 |

* cited by examiner

*Primary Examiner* — Charles A Fox
*Assistant Examiner* — Gregory T Prather
(74) *Attorney, Agent, or Firm* — Robert James Harwood

(57) ABSTRACT

An electromechanically assisted steering system is proposed, having a worm drive which comprises a worm shaft and a worm gear, an electric motor which has a drive shaft, and a spring element. At an end assigned to the electric motor, the worm shaft has a first bearing portion which is connected to the drive shaft in a torque-transmitting manner. The worm shaft has a second bearing portion which is arranged at an end of the worm shaft remote from the first bearing portion. The spring element is connected to the first bearing portion or to the second bearing portion so as to transmit axial force in the axial direction, such that the spring element axially pretensions the worm shaft relative to the worm gear. A tolerance compensation of the worm drive in the axial direction of the worm shaft is carried out exclusively via the spring element.

12 Claims, 2 Drawing Sheets

ELECTROMECHANICALLY ASSISTED STEERING SYSTEM

CROSS-REFERENCE TO RELATED APPLICATION

This application claims priority to German Patent Application No. 102019115232.1 filed Jun. 5, 2019, the disclosure of which is incorporated herein by reference in its entirety.

TECHNICAL FIELD

The present disclosure relates to an electromechanically assisted steering system having a worm drive.

BACKGROUND

Certain types of electromechanically assisted steering systems which are known from the prior art have a worm drive, an auxiliary motor of the steering system being connected thereby in a force-transmitting manner to a steering column (steering system with steering column assistance, often denoted in English as "EPS column drive") or to a pinion which is in engagement with a rack of the steering system (steering system with single pinion drive or steering system with dual pinion, often denoted in English as "pinion drive EPS" and/or "dual pinion EPS").

A worm shaft of the worm drive is generally rotatably mounted by means of a fixed bearing on an end assigned to the electric motor. A clutch device, which connects the worm shaft to the drive shaft in a torque-transmitting manner, and a pretensioning device are provided between the worm shaft and a drive shaft of the electric motor in order to apply a pretensioning force to the worm shaft in the axial direction and to keep this pretensioning force within a specific tolerance range.

The worm shaft is able to be moved with a predefined axial play so that due to the pretensioning force said worm shaft is able to follow an assigned worm gear without play, even in the case of vibrations being present in the worm drive.

The pretensioning force is always designed to be within a predefined tolerance range. A particular requirement in this case is to compensate for production tolerances which are present in the worm drive. In addition, the dimensions of the worm gear may alter according to the temperature, humidity and/or wear state, which also has to be compensated.

In the electromechanically assisted steering systems which are known from the prior art, additional components are frequently used in order to compensate for these tolerances. However, the additional components result in further costs and increase the complexity of the assembly of the steering system, in particular the worm drive.

SUMMARY

It is the object of the present disclosure, therefore, to provide an electromotively assisted steering system in which the drawbacks of the prior art are remedied.

The object is achieved according to the present disclosure by an electromechanically assisted steering system, having a worm drive which comprises a worm shaft and a worm gear, an electric motor which has a drive shaft, and a spring element. At an end assigned to the electric motor, the worm shaft has a first bearing portion which is connected to the drive shaft in a torque-transmitting manner. The worm shaft has a second bearing portion which is arranged at an end of the worm shaft remote from the first bearing portion. The spring element is connected to the first bearing portion or to the second bearing portion so as to transmit axial force in the axial direction, such that the spring element axially pretensions the worm shaft relative to the worm gear. A tolerance compensation of the worm drive in the axial direction of the worm shaft is carried out exclusively via the spring element.

In the electromechanically assisted steering system according to the present disclosure, therefore, no further components are required apart from the spring element in order to compensate for the dimensional tolerances of the worm drive. As a result, the production costs of the worm drive are reduced and the assembly is facilitated.

In particular, in the electromechanically assisted steering system according to the present disclosure, the compensation of the axial dimensional tolerances is achieved by selecting an appropriate spring stiffness of the spring element, wherein the spring stiffness is lower than is usual in the prior art. With a low spring stiffness, deviations in the axial dimensions lead to a smaller variation in the axial pretensioning force.

The spring stiffness is selected such that, even with the occurrence of an anticipated maximum deviation in the axial dimensions, the axial pretensioning force is still within a predefined tolerance range for the axial pretensioning force.

The predefined tolerance range in this case is, for example, 200 N to 300 N, in particular 225 N to 275 N.

The spring element may be a coil spring or a wave spring, in particular a wave spring unit. Coil springs have the advantage that they are very advantageous in terms of production, whereby the costs of the worm drive are reduced. Wave springs and/or wave spring units have the advantage that, in the case of the same pretensioning force having to be applied, they require a smaller axial constructional space than comparable coil springs.

According to one feature of the present disclosure, the spring element is axially supported at one of its ends directly on the worm shaft, in particular wherein the spring element is axially supported at its other end on the drive shaft. Accordingly, the drive shaft absorbs the pretensioning force applied by the spring element, which is why in this embodiment of the present disclosure the electric motor is preferably configured as a double-bearing motor in which the drive shaft is mounted by means of two bearings.

A further feature of the present disclosure provides that at its end assigned to the electric motor, the worm shaft has an axial opening in which the spring element is at least partially received. As a result, more constructional space is available for the spring element and the spring stiffness of the spring element may be dimensioned to be lower. As a result, the electromechanically assisted steering system is less sensitive to axial dimensional tolerances.

In a further embodiment of the present disclosure, the spring element is directly supported at the one end on an axial defining wall of the axial opening. Thus no further components are provided between the axial defining wall and the spring element. The axial opening is available, therefore, with its entire length as constructional space for the spring element.

Preferably, at its end assigned to the worm shaft, the drive shaft protrudes into the axial opening, at most up to an eighth of the axial extent of the axial opening, or terminates outside the axial opening. As a result, more constructional space is available for the spring element and the spring stiffness of the spring element may be dimensioned to be lower. As a result, the electromechanically assisted steering system is less sensitive to axial dimensional tolerances.

Preferably, the drive shaft and the worm shaft are not in mutual contact. Thus no friction is present between the drive shaft and the worm shaft.

An optionally present static radial offset and/or a dynamic radial offset between the drive shaft and the worm shaft, which is present during operation of the worm drive, may be compensated by the spring element. Thus the spring element is designed such that a maximum radial offset which is present between the drive shaft and the worm shaft is within a radial mobility of the spring element defined by the flexibility of the spring element.

According to one feature of the present disclosure, the spring element is guided by a radial defining wall of the axial opening and/or by a pin which is arranged on a front face of the drive shaft facing the worm shaft. In other words, the axial defining wall of the axial opening represents a bushing for the spring element. The axial defining wall prevents the spring element from buckling under load at its end assigned to the worm shaft. Similarly, the pin prevents the spring element from buckling under load at its end assigned to the drive shaft.

A further embodiment of the present disclosure provides that the worm shaft is rotatably mounted on its second bearing portion by means of a bearing, in particular a floating bearing, wherein the spring element is axially supported at one of its ends on the bearing and wherein the bearing transmits an axial pretensioning force of the spring element to the worm shaft. Since the spring element in this embodiment is not supported on the drive shaft of the electric motor, the axial dimensional tolerances of the drive shaft are irrelevant for setting the pretensioning force. In this regard, therefore, the worm drive represents a closed functional unit which is able to be tested.

In particular, the drive shaft is free of axial pretensioning forces. Thus in this embodiment the electric motor may be configured as a single-bearing motor in which the drive shaft is mounted by means of a single bearing.

The bearing may be configured as a four-point bearing. This type of bearing is particularly well suited to transmitting axial forces, in particular between an outer race of the bearing and an inner race of the bearing. However, any other suitable type of bearing may also be used.

A further feature of the present disclosure provides that the spring element is axially supported on an outer race of the bearing, wherein the worm shaft is mounted in an inner race of the bearing. The axial pretensioning force of the spring element is accordingly transmitted from the outer race to the inner race of the bearing and from the inner race to the worm shaft.

Preferably, the spring element has a spring constant of at most 100 N/mm, in particular a spring constant of between 5 N/mm and 70 N/mm, preferably a spring constant of between 10 N/mm and 30 N/mm. It has been proved that by dimensioning the spring constant in this range both the axial pretensioning force may be reliably kept within the tolerance range and axial dimensional tolerances may also be reliably compensated.

BRIEF DESCRIPTION OF THE DRAWINGS

Further advantages and features of the present disclosure are disclosed from the following description and the accompanying drawings, reference being made thereto. In the drawings.

DETAILED DESCRIPTION

Figure 1:
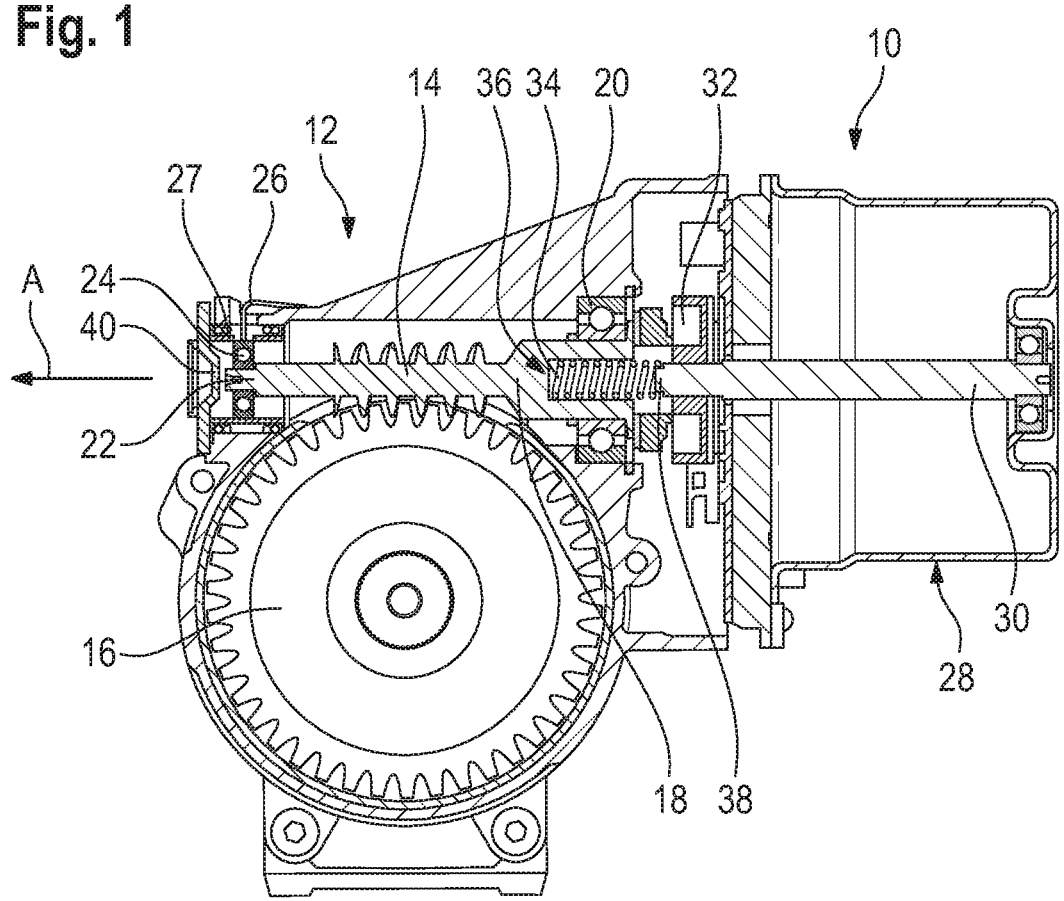
FIG. 1 shows in a sectional view an electromechanically assisted steering system according to the present disclosure, according to a first embodiment.
Figure 2A:
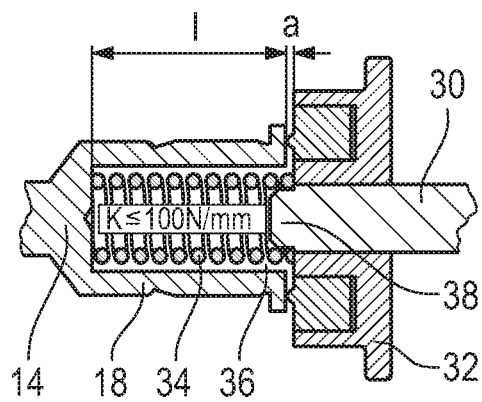
FIG. 2*a* shows in a first sectional view a detail of the electromechanically assisted steering system according to the present disclosure of FIG. 1.
Figure 2B:
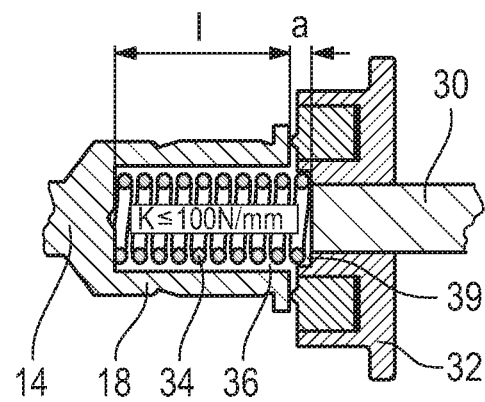
FIG. 2*b* shows in a second sectional view a detail of the electromechanically assisted steering system according to the present disclosure of FIG. 1.
Figure 3:
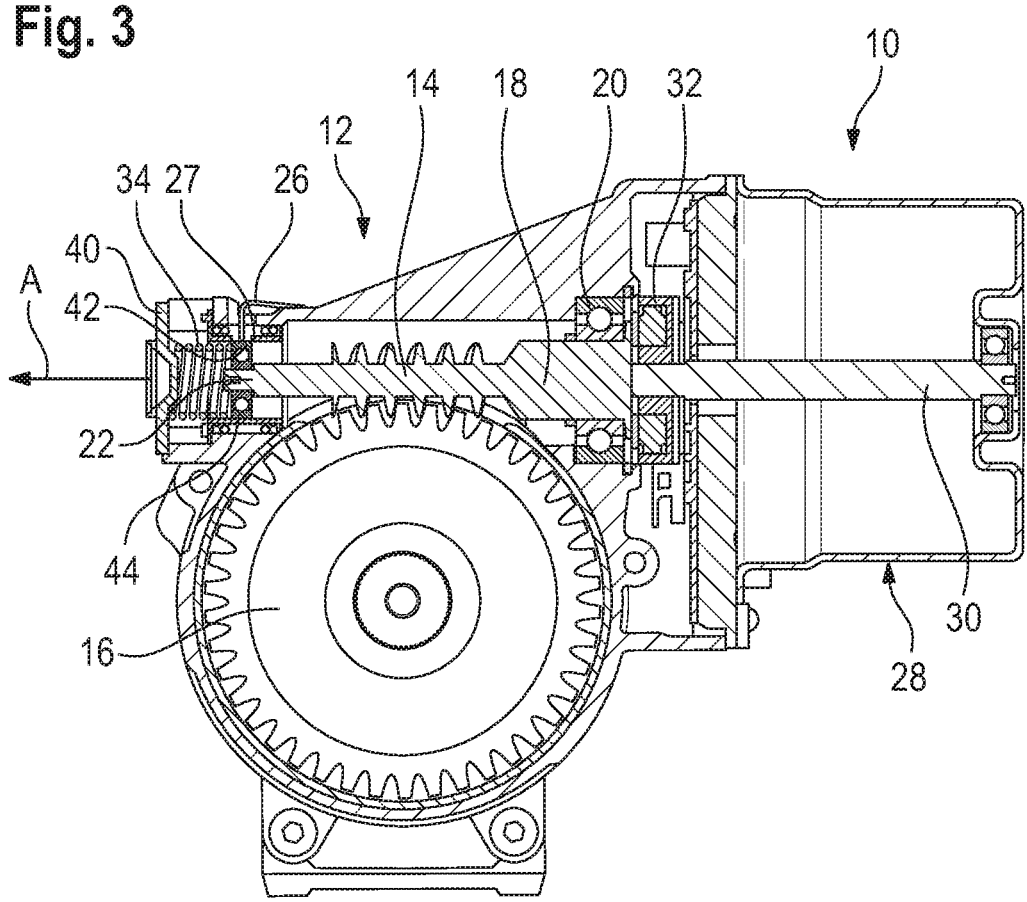
FIG. 3 shows in a sectional view an electromechanically assisted steering system according to the present disclosure, according to a second embodiment.

FIGS. 1 to 3 show in each case schematically in a sectional view an electromechanically assisted steering system 10 for a motor vehicle which comprises a worm drive 12 with a worm shaft 14 and a worm gear 16.

The worm shaft 14 has at one of its ends a first bearing portion 18 on which the worm shaft 14 is rotatably mounted by means of a fixed bearing 20 about the axial direction A thereof.

At its other end the worm shaft 14 has a second bearing portion 22 on which the worm shaft 14 is rotatably mounted by means of a floating bearing 24 about the axial direction A thereof.

Moreover, the floating bearing 24 together with the worm shaft 14 are pivotable relative to the worm gear 16 in a predefined manner, wherein the center of the pivoting movement is within the region of the fixed bearing 20 and wherein the plane of the pivoting movement coincides with the cutting plane of FIG. 1. In order to dampen this pivoting movement, a damping device 26 which is configured to dampen the pivoting movement of the worm shaft 14 may be provided in the region of the floating bearing 24.

In the example shown in practice in FIGS. 1 and 3, the damping device 26 is a spring. The steering system 10 also has an electric motor 28 which is assigned to the first bearing portion 18 of the worm shaft 14. The electric motor 28 has a drive shaft 30 which is connected via a clutch device 32 to the worm shaft 14 and thus also to the worm gear 16 in a torque-transmitting manner. The worm gear 16 in turn is coupled in a force-transmitting manner to a steering column or a rack of the steering system 10. Thus, in this case, it is an electromotively assisted steering system 10 with a steering column drive and/or with a rack and pinion drive. The electric motor 28 accordingly assists the driver, when steering the motor vehicle, by applying an auxiliary force and/or an auxiliary torque to the steering column and/or the rack via the drive shaft 30, the worm shaft 14 and the worm gear 16.

In such electromechanically assisted steering systems, the worm shaft 14 has to be axially pretensioned relative to the worm gear 16, so that the worm shaft 14 is able to follow the worm gear 16 even in the case of vibrations being present in the worm drive 12.

The pretensioning force in this case is always designed to be within a predefined tolerance range, for example 200 N to 300 N, in particular 225 N to 275 N. In this case, production tolerances which are present in the worm drive 12 have to be compensated in order to keep the pretensioning force within the predefined tolerance range. Additionally, the dimensions of the worm gear 16 may alter according to the temperature, humidity and/or wear state, which also has to be compensated.

Both in the embodiment shown in FIG. 1 and that shown in FIG. 3, the pretensioning of the worm shaft 14 relative to the worm gear 16 is carried out by a spring element 34, the arrangement and mode of operation thereof being described in more detail hereinafter. The spring element 34, for example, is a coil spring or a wave spring, in particular a wave spring unit.

According to a first embodiment of the steering system 10 which is shown in FIGS. 1, 2a and 2b, the spring element 34 is supported at its one end on the drive shaft 30 and at its other end directly on the worm shaft 14. Since in this embodiment an axial force is applied to the drive shaft 30 by the spring element 34, the electric motor 28 is preferably a double-bearing motor in which the drive shaft 30 is mounted by means of two bearings. The worm shaft 14 has in the region of the first bearing portion 18 an axial opening 36 in which the spring element 34 is at least partially received. The spring element 34 is supported at its end remote from the drive shaft 30 on an axial defining wall of the axial opening 36. A radial defining wall of the axial opening 36 in this case serves as a guide for the spring element 34. In other words, the radial defining wall of the axial opening 36 thus represents a bushing for the spring element 34 which prevents buckling of the spring element 34 under load.

Moreover, a pin 38 is arranged on the drive shaft 30 at an end of the drive shaft 30 assigned to the worm shaft 14, wherein the spring element 34 is guided via the pin 38. The pin 38 prevents the spring element 34 from buckling under load at its end assigned to the drive shaft 30. The spring element 34, therefore, is guided at least at its two ends by the radial defining wall of the axial opening 36 and/or by the pin 38 in order to prevent buckling of the spring element 34 under load. Preferably, the drive shaft 30 and the worm shaft 14 are not in mutual contact so that no direct contact is present between the drive shaft 30 and the worm shaft 14. A static radial offset which is potentially present for this reason and/or a dynamic radial offset between the drive shaft 30 and the worm shaft 14 which occurs during operation of the worm drive 12 is compensated by the spring element 34. Accordingly, the spring element 34 is designed such that a maximum radial offset which is present between the drive shaft 30 and the worm shaft 14 is within a radial mobility of the spring element 34 defined by the flexibility of the spring element 34.

As may be identified in FIGS. 1, 2a and 2b, the drive shaft 30 terminates outside the axial opening 36 and/or protrudes into said axial opening, at most by up to an eighth of the axial extent l of the axial opening 36. Accordingly, there is more constructional space available for the spring element 34 which as a result may be dimensioned with a lower spring stiffness than is usual in the prior art. More specifically, the spring element 34 has a spring constant K of at most 100 N/mm, preferably a spring constant K of between 5/N/mm and 70 N/mm, further preferably a spring constant K of between 10 N/mm and 30 N/mm. By this choice of spring constant K it is ensured that the spring element 34 applies a pretensioning force to the worm shaft 14 within the predefined tolerance range.

At the same time, due to the low spring constant (as shown in FIG. 2b), the spring element 34 may compensate for axial dimensional tolerances of the worm drive 12 and/or the electric motor 28, in particular also axial dimensional tolerances of the drive shaft 30. No further components are required for compensating for the axial dimensional tolerances.

According to a second embodiment of the steering system 10 which is shown in FIG. 3, the spring element 34 is arranged at the end of the worm shaft 14 which is remote from the electric motor 28. The spring element 34 is supported at its one end on the floating bearing 24, more specifically on an outer race 42 of the floating bearing 24, and at its other end on a housing part 40 of the worm drive 12. In the exemplary embodiment shown, the housing part 40 is a removable protective cap. The floating bearing 24 transmits the axial pretensioning force of the spring element 34 from the outer race 42 of the floating bearing 24 to an inner race 44 of the floating bearing 24 and thus onto the worm shaft 14 which is mounted in the inner race 44 of the floating bearing 24. Accordingly, the floating bearing 24 is preferably a type of bearing which is suitable for transmitting axial forces. For example, the floating bearing 24 is a four-point bearing but any other suitable type of bearing may also be used.

Since the spring element 34 in this embodiment is not supported on the drive shaft 30, the drive shaft 30 is free of axial pretensioning forces. Thus in this embodiment the electric motor 28 may be configured as a single-bearing motor in which the drive shaft 30 is mounted by means of a single bearing. The spring element 34 may be fixedly connected to the outer race of the floating bearing 24, so that with a pivoting movement of the worm shaft 14 the spring element 34 is bent and thus counteracts the pivoting movement. In particular, the damping device 26 may be eliminated.

What is claimed is:

1. An electromechanically assisted steering system, having a worm drive comprising:
   a worm shaft and a worm gear;
   an electric motor which has a drive shaft; and
   a spring element;
   wherein at an end assigned to the electric motor, the worm shaft has a first bearing portion which is connected to the drive shaft in a torque-transmitting manner, and an axial opening in which the spring element is at least partially received, a worm shaft-assigned end of the drive shaft terminating outside of the axial opening or protruding at most an eighth of an axial extent of the axial opening into the axial opening,
   wherein the worm shaft has a second bearing portion which is arranged at an end of the worm shaft remote from the first bearing portion,
   wherein the spring element is connected to the first bearing portion so as to transmit axial force in the axial direction, such that the spring element axially pretensions the worm shaft relative to the worm gear, and
   wherein a tolerance compensation of the worm drive in the axial direction of the worm shaft is carried out exclusively via the spring element.

2. The electromechanically assisted steering system as defined in claim 1, wherein a first end of the spring element is axially supported directly on the worm shaft, a second end of the spring element being axially supported on the drive shaft.

3. The electromechanically assisted steering system as defined in claim 2, wherein the first end of the spring element is directly supported on an axial defining wall of the axial opening.

4. The electromechanically assisted steering system as defined in claim 1, wherein the axial opening is at an electric motor-assigned end of the worm shaft.

5. The electromechanically assisted steering system as defined in claim 1, wherein the worm shaft-assigned end of the drive shaft terminates outside the axial opening.

6. The electromechanically assisted steering system as claimed in one of claim 1, wherein the spring element is guided by a radial defining wall of the axial opening and/or by a pin which is arranged on a front face of the worm shaft-assigned end of the drive shaft facing.

7. The electromechanically assisted steering system as defined in claim 1, wherein a spring constant of the spring element is between 5 N/mm and 70 N/mm.

8. The electromechanically assisted steering system as defined in claim 1, wherein a spring constant of the spring element is between 10 N/mm and 30 N/mm.

9. The electromechanically assisted steering system as defined in claim 1, wherein the worm shaft-assigned end of the drive shaft includes a pin that guides the spring element, the pin terminating outside of the axial opening or protruding at most an eighth of the axial extent of the axial opening into the axial opening.

10. The electromechanically assisted steering system as defined in claim 9, wherein the pin terminates outside of the axial opening.

11. The electromechanically assisted steering system as defined in claim 1, wherein a length of an axial extent of the spring element is at least equal to a length of the axial extent of the axial opening.

12. The electromechanically assisted steering system as defined in claim 1, wherein the spring element has a spring constant of at most 100 N/mm.

\* \* \* \* \*